(12) United States Patent
Han

(10) Patent No.: US 10,262,117 B2
(45) Date of Patent: Apr. 16, 2019

(54) INFORMATION PROCESSING SYSTEM, INFORMATION PROCESSING APPARATUS, AND INFORMATION PROCESSING METHOD

(71) Applicant: Xiaofeng Han, Kanagawa (JP)

(72) Inventor: Xiaofeng Han, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 47 days.

(21) Appl. No.: 15/518,169

(22) PCT Filed: Oct. 22, 2015

(86) PCT No.: PCT/JP2015/005319
§ 371 (c)(1),
(2) Date: Apr. 10, 2017

(87) PCT Pub. No.: WO2016/067571
PCT Pub. Date: May 6, 2016

(65) Prior Publication Data
US 2017/0255763 A1 Sep. 7, 2017

(30) Foreign Application Priority Data
Oct. 29, 2014 (JP) .................... 2014-220828

(51) Int. Cl.
*G06F 21/12* (2013.01)
*G06F 21/33* (2013.01)
(Continued)

(52) U.S. Cl.
CPC .......... *G06F 21/121* (2013.01); *G06F 17/289* (2013.01); *G06F 21/12* (2013.01);
(Continued)

(58) Field of Classification Search
CPC ........ G06F 21/12; G06F 21/121; G06F 21/33; G06F 21/335; G06F 21/41; G06F 21/606; G06F 17/289; H04L 63/08; H04W 1/00
See application file for complete search history.

(56) References Cited

U.S. PATENT DOCUMENTS

2006/0217956 A1* 9/2006 Nagao ................. G06F 17/241
704/2
2008/0300858 A1* 12/2008 Konno ................. G06F 17/211
704/4
(Continued)

FOREIGN PATENT DOCUMENTS

CN 103186526 A 7/2013
JP 4474440 3/2010
(Continued)

OTHER PUBLICATIONS

International Search Report dated Jan. 26, 2016 in PCT/JP2015/005319 filed Oct. 22, 2015.
(Continued)

*Primary Examiner* — Minh Dinh
(74) *Attorney, Agent, or Firm* — Oblon, McClelland, Maier & Neustadt, L.L.P.

(57) ABSTRACT

An information processing system includes an information processing apparatus, a server, first and second obtaining units, an addition unit, and a second processing unit. The first obtaining unit obtains second information indicating first information held by the server when the information processing apparatus has not previously included the first information to perform second processing necessary for first processing. When receiving a first request for requesting to perform the first processing, the second obtaining unit obtains token information indicating the presence of the authority to use the second information. When the second obtaining unit has obtained the token information, the addi-
(Continued)

tion unit adds the token information to a second request for requesting to perform the second processing. Only when the token information has been added to the second request, the second processing unit performs the second processing by using the second information.

10 Claims, 10 Drawing Sheets

(51) Int. Cl.
*H04N 1/00* (2006.01)
*G06F 17/28* (2006.01)
*G06F 21/41* (2013.01)
*G06F 21/60* (2013.01)
*H04L 29/06* (2006.01)

(52) U.S. Cl.
CPC ............ *G06F 21/33* (2013.01); *G06F 21/335* (2013.01); *G06F 21/41* (2013.01); *G06F 21/606* (2013.01); *H04L 63/08* (2013.01); *H04N 1/00* (2013.01)

(56) References Cited

U.S. PATENT DOCUMENTS

| | | |
|---|---|---|
| 2008/0316529 A1 | 12/2008 | Hamatani |
| 2011/0216357 A1 | 9/2011 | Kouno |
| 2013/0086645 A1 | 4/2013 | Srinivasan et al. |
| 2013/0086657 A1 | 4/2013 | Srinivasan et al. |
| 2014/0090028 A1 | 3/2014 | Matsugashita |

FOREIGN PATENT DOCUMENTS

| | | |
|---|---|---|
| JP | 2011-257876 | 12/2011 |
| JP | 2014-086040 | 5/2014 |

OTHER PUBLICATIONS

Extended European Search Report dated Oct. 10, 2017 in Patent Application No. 15855519.3.
Kathleen Wirth, "Unique Fuji Xerox Scan Translation Service Enables MFPs to Translate Documents into Four Different Languages", Wirth Consulting, XP002773648, 2012, pp. 1-2.

* cited by examiner

[Fig. 1]
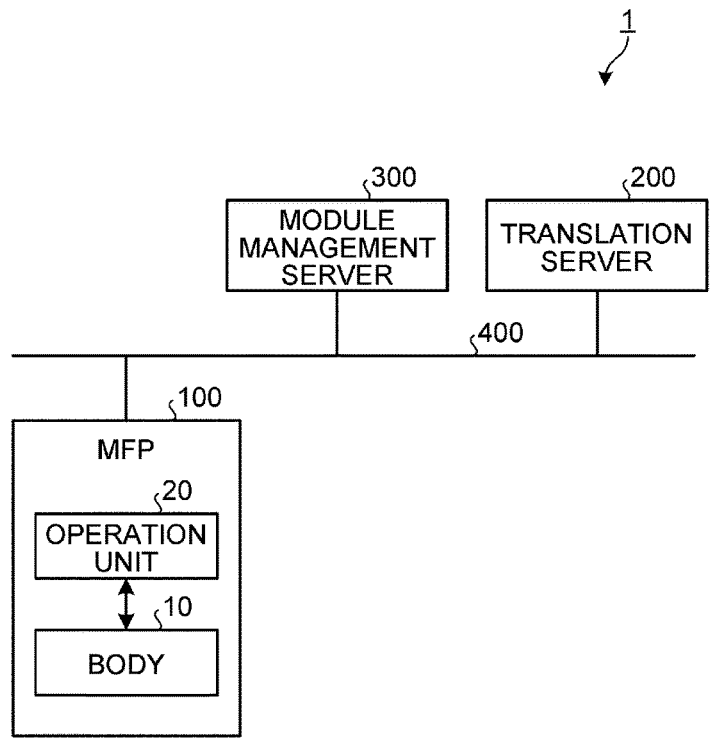
[Fig. 2]
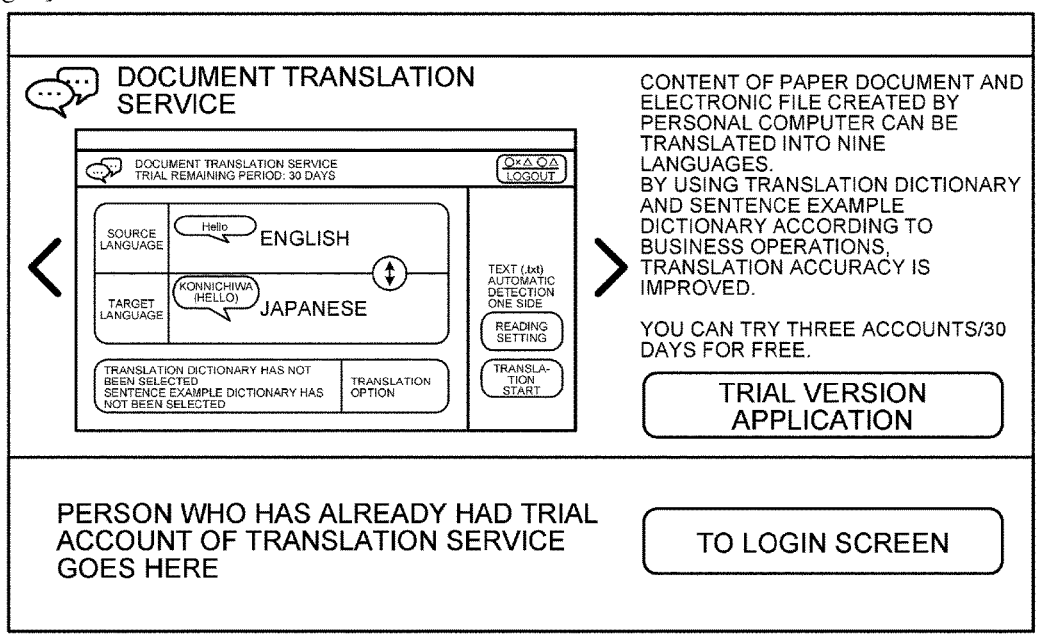

[Fig. 3]
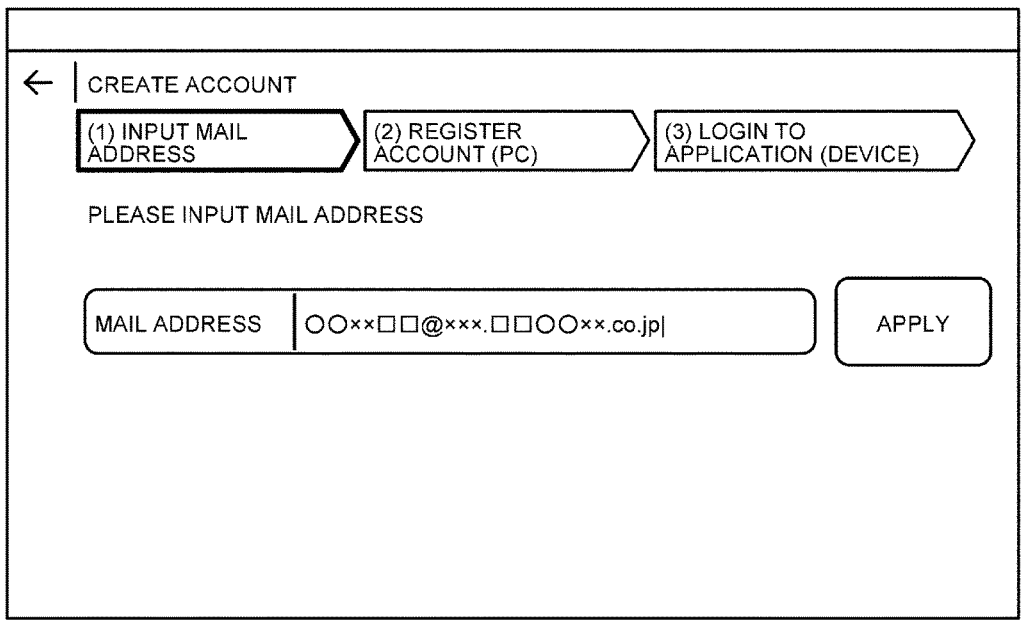
[Fig. 4]
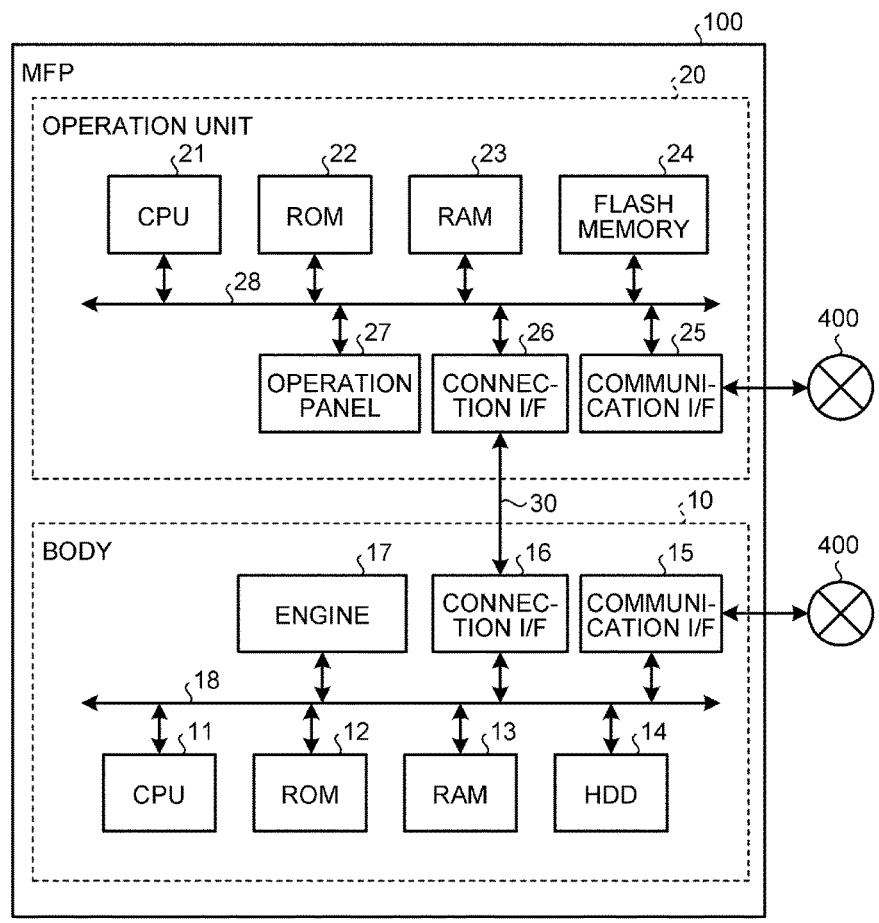

[Fig. 5]
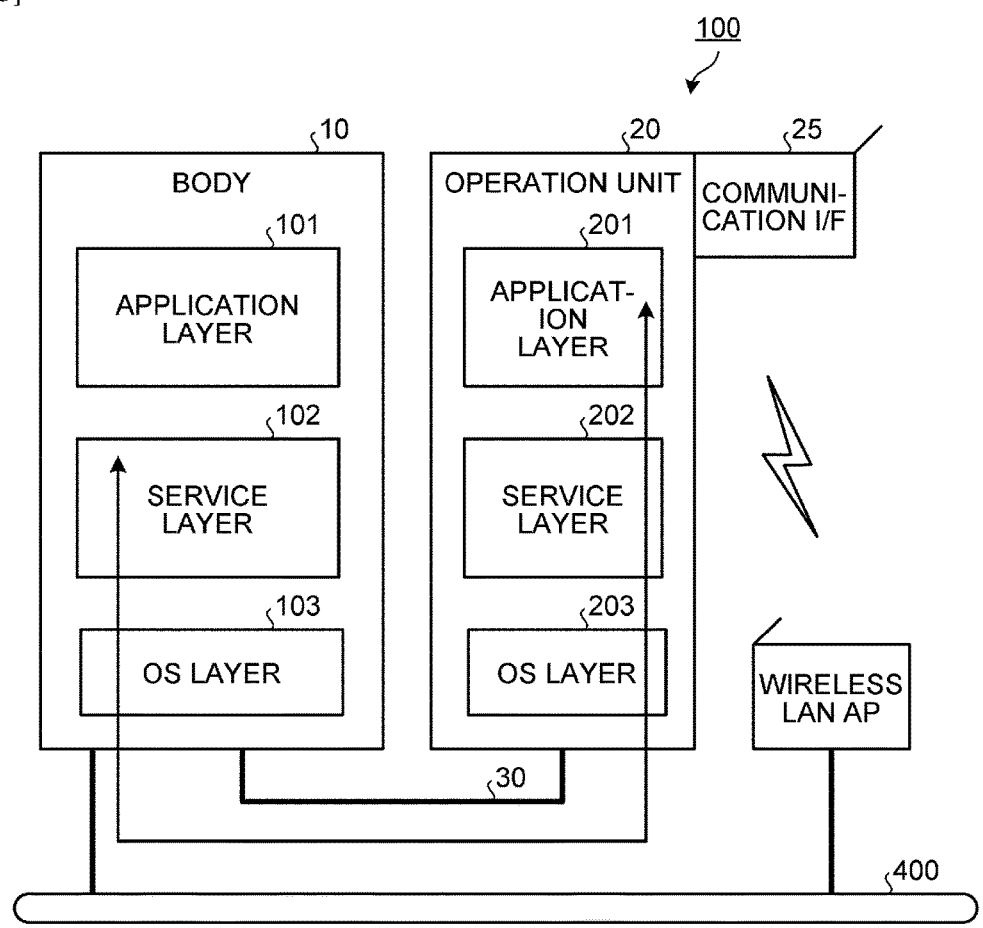

[Fig. 6]
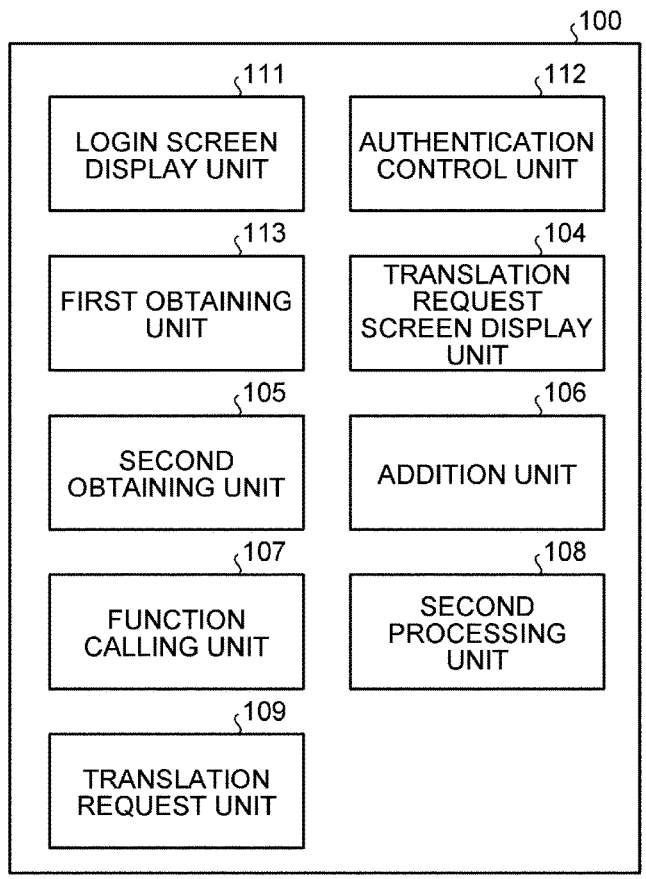
[Fig. 7]
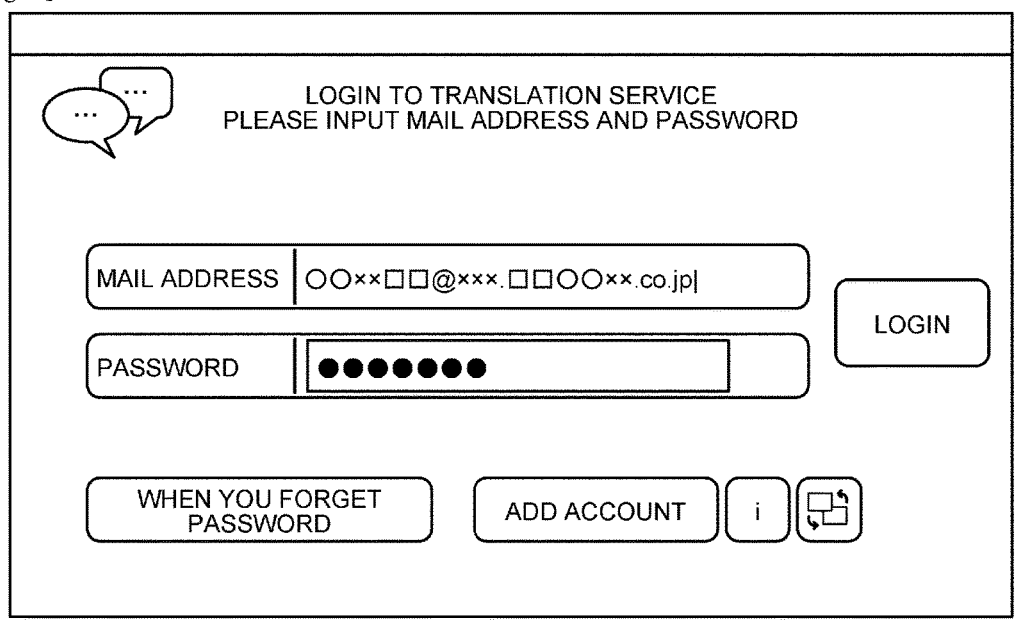

[Fig. 8]
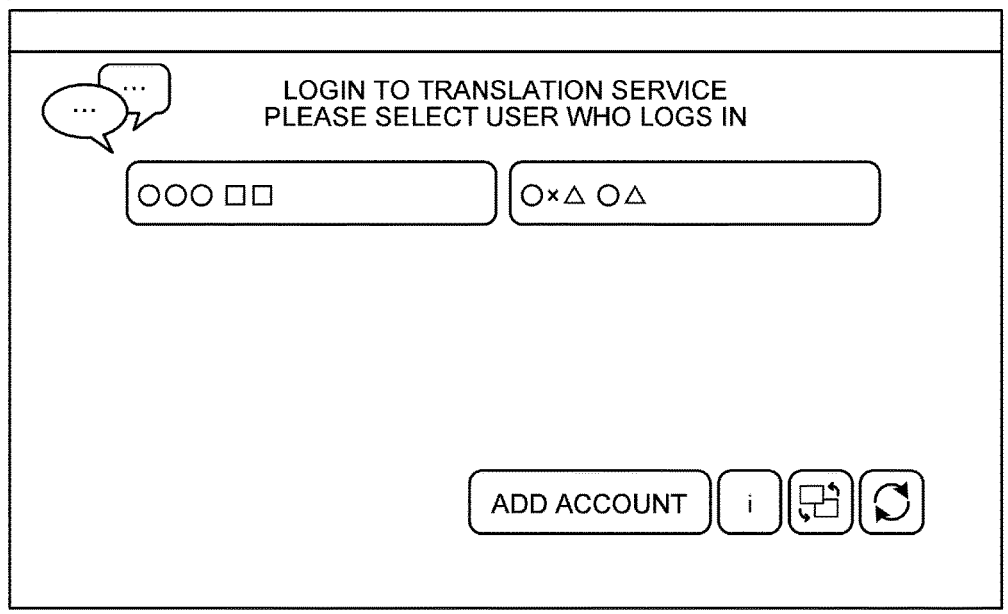
[Fig. 9]
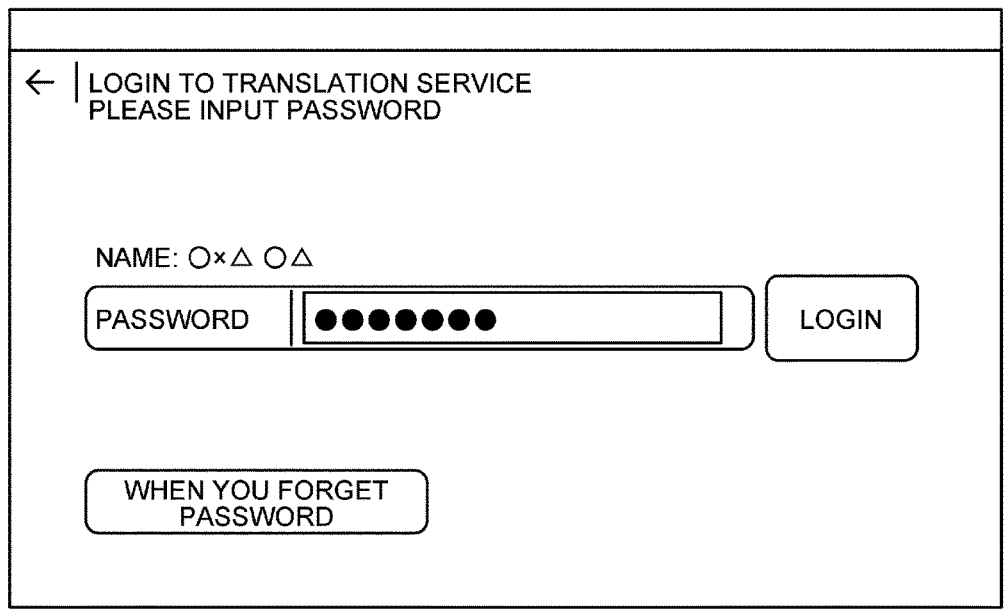

[Fig. 10]

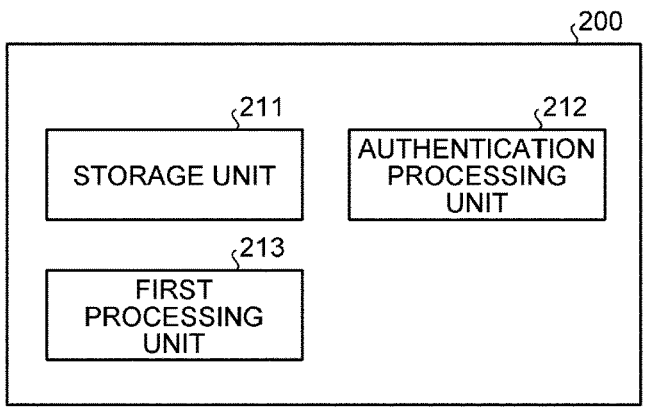

[Fig. 11]

```
{
  "jobSettingCapability": {
    "originalSizeList": [
      "auto","mixed","iso_a3","iso_a3_landscape","iso_a4","iso_a4_landscape"
    ],
    "scanColorList": [
      "auto_color","monochrome_text","monochrome_text_photo","grayscale","color_text_photo"
    ],
    "scanningResolutionList": [
      "100","200","300","400","600"
    ],
    "originalSides": [
      "one_sided","top_to_top","top_to_bottom","spread"
    ],
    "ocrList": [
      "true","false"
    ],
    "ocrLanguageList": [
      "ja","en-GB","en-US","fr","de","it" .....
    ],
    "omitBlankPageList": [
      "true","false"
    ], .....
  }
}
```

[Fig. 12]
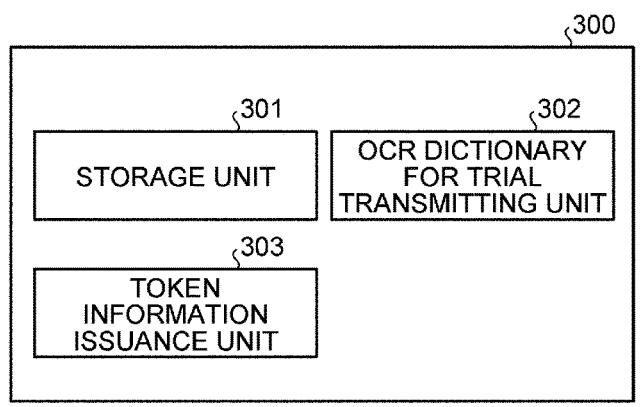
[Fig. 13]
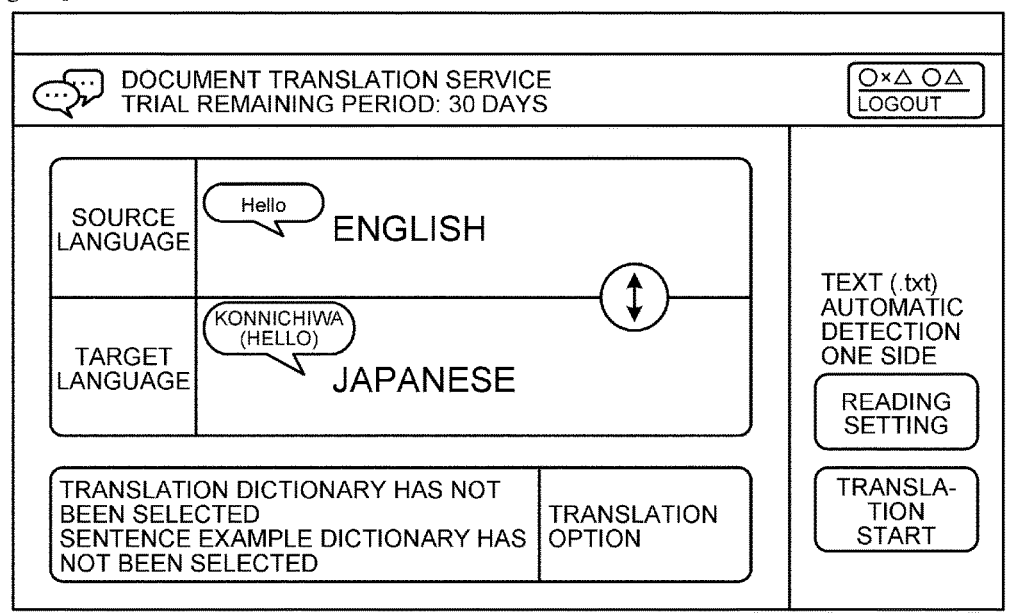

[Fig. 14]

| Key | FORMAT OF Value (SAMPLE) |
|---|---|
| ID | uuid FORMAT<br>550e8400-e29b-41d4-a716-446655440000 |
| RequestedTime | RFC3339 FORMAT<br>2012-04-23T18:25:43.511Z |
| ExpiryTime | RFC3339 FORMAT<br>2012-04-23T19:25:43.511Z |
| ServiceClass | FIXED CHARACTER STRING<br>translate |
| ChargeKind | FIXED CHARACTER STRING<br>trial |

[Fig. 15]
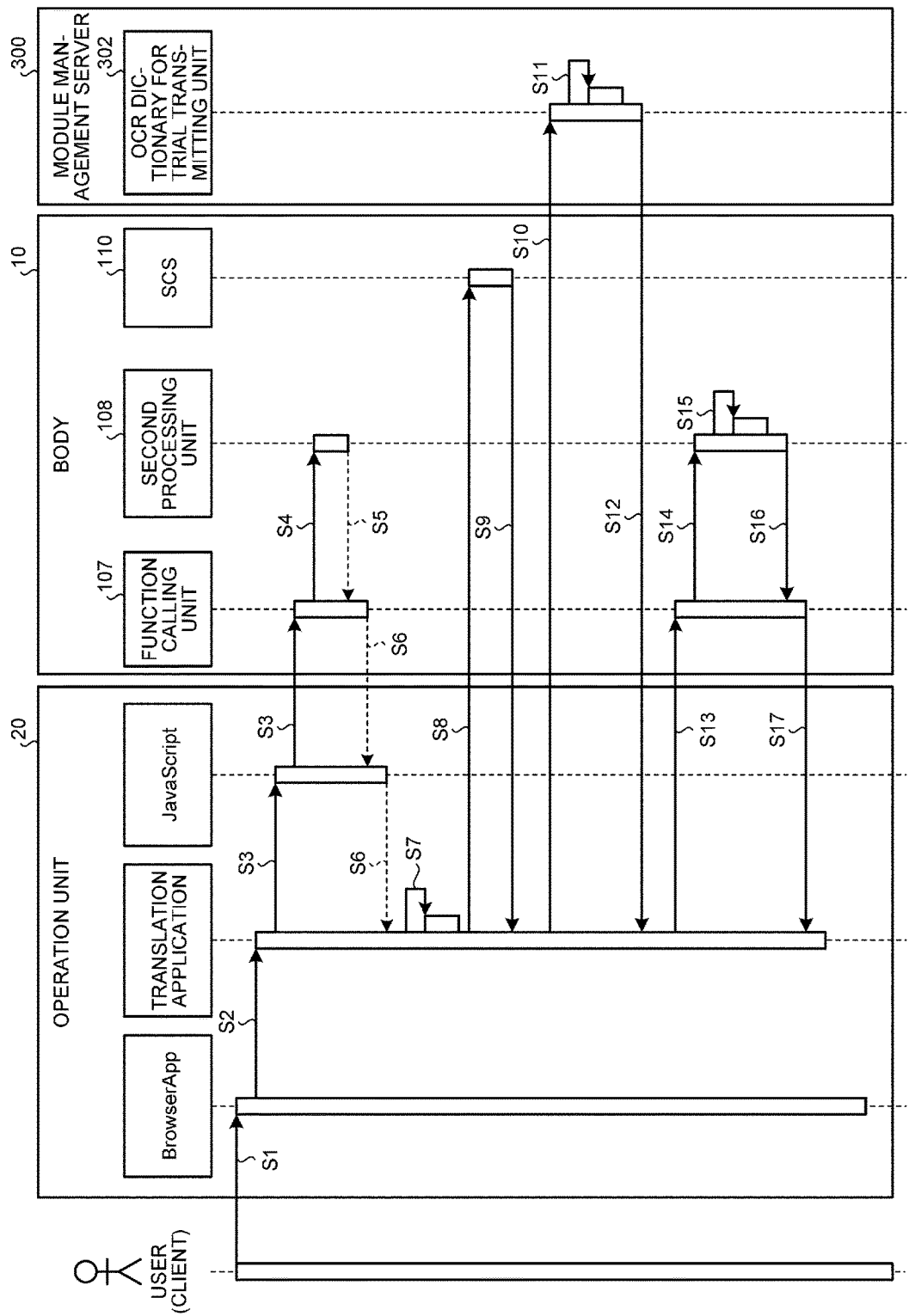

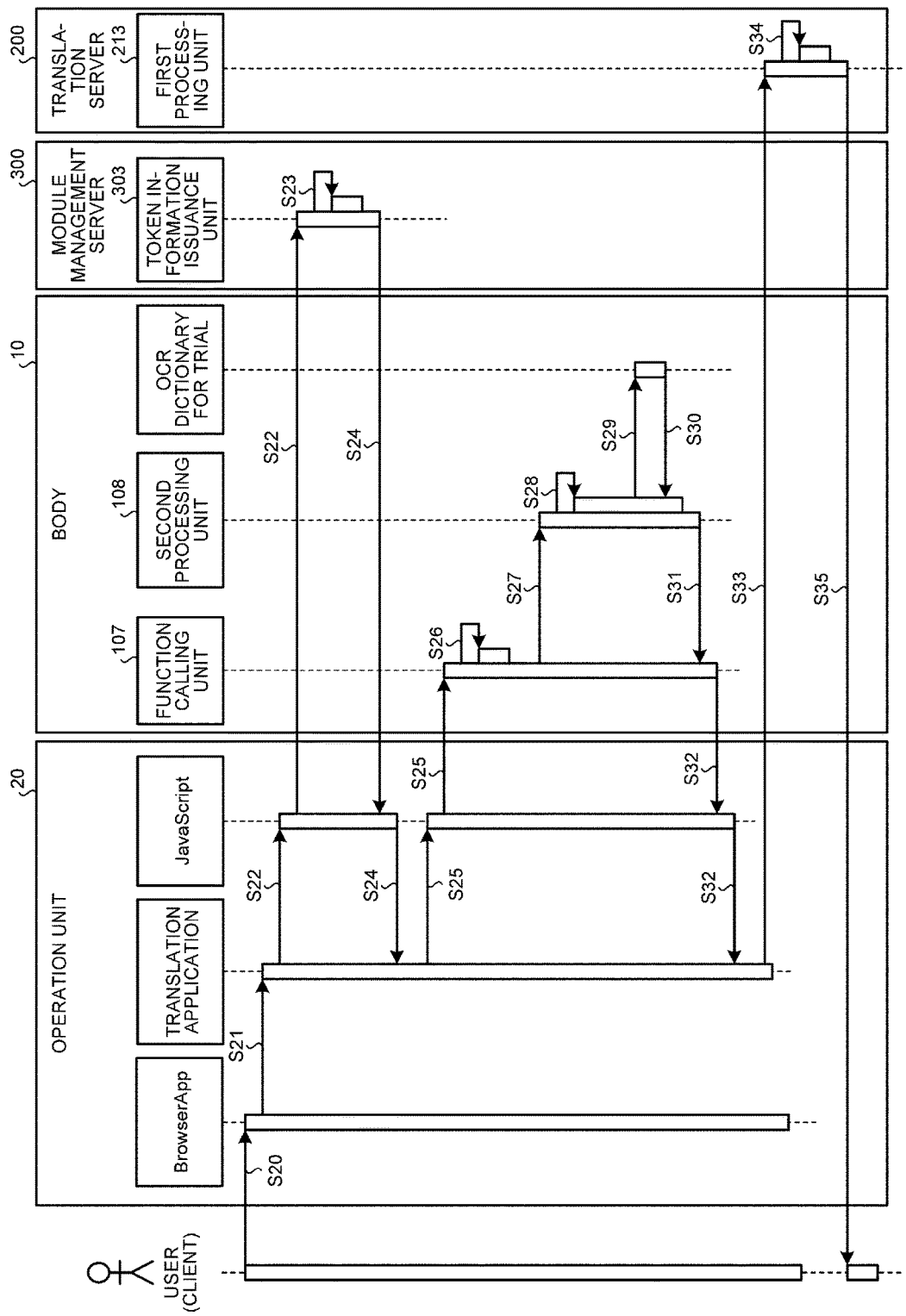
[Fig. 16]

INFORMATION PROCESSING SYSTEM, INFORMATION PROCESSING APPARATUS, AND INFORMATION PROCESSING METHOD

TECHNICAL FIELD

The present invention relates to an information processing system, an information processing apparatus, and an information processing method.

BACKGROUND ART

In recent years, according to an expansion of the range of a cloud service, a vendor has put effort into development of an application associated with the cloud service. Therefore, for example, a number of new functions which can be associated with the cloud service have been developed by using a basic function (scan, print, fax, and the like) of a multifunction peripheral. To verify the effect of the new function to be added, a business model (may be referred to as "free trial" below) has appeared which allows a client to use the function for free for a certain period.

With the addition of the functions, it is necessary for a device to be used by the client (may be referred to as "client device" below) to have information necessary for performing the new functions (including module, data, and the like). For example, Patent Literature 1 discloses a technique for automatically downloading an application from an external server when an MFP (a client device) does not have the application necessary for performing a specific service.

SUMMARY OF INVENTION

Technical Problem

However, for example, information which has been previously prepared for the free trial (may be referred to as "information for free trial" below) is supplied from the server to the client device (when installed to the client device) since the client device does not include the information necessary for performing the function, there is a possibility that the information for the free trial is used for a function other than the added functions.

Solution to Problem

According to an embodiment of the present invention, there is provided an information processing system comprising: an information processing apparatus; and a server, wherein the information processing apparatus includes a first obtaining unit which obtains second information indicating first information held by the server when the information processing apparatus has not been previously included the first information to perform second processing necessary for first processing, a second obtaining unit which obtains token information indicating the presence of the authority to use the second information when receiving a first request for requesting to perform the first processing, an addition unit which adds the token information to a second request for requesting to perform the second processing when the second obtaining unit has obtained the token information, and a second processing unit which performs the second processing by using the second information only when the token information has been added to the second request.

Advantageous Effect of Invention

According to the embodiment of the present invention, the information supplied from the server to the information processing apparatus as adding the functions can be prevented from being used for a function other than the added functions.

BRIEF DESCRIPTION OF DRAWINGS

FIG. 1 is a diagram of an exemplary outline structure of an information processing system according to an embodiment of the present invention.

FIG. 2 is a diagram of an exemplary trial home page in the embodiment.

FIG. 3 is a diagram of an exemplary account creation screen in the embodiment.

FIG. 4 is a diagram of an exemplary hardware configuration of an MFP (an information processing apparatus) included in the information processing system of the embodiment.

FIG. 5 is a diagram of an exemplary software configuration of the MFP.

FIG. 6 is a diagram of an exemplary function configuration of the MFP.

FIG. 7 is a diagram of an exemplary login screen in the embodiment.

FIG. 8 is a diagram of another example of the login screen in the embodiment.

FIG. 9 is a diagram of still another example of the login screen in the embodiment.

FIG. 10 is a diagram of an exemplary function configuration of a translation server included in the information processing system.

FIG. 11 is a diagram of exemplary scanner capability information in the embodiment.

FIG. 12 is a diagram of an exemplary function configuration of a module management server included in the information processing system.

FIG. 13 is a diagram of an exemplary translation request screen in the embodiment.

FIG. 14 is a diagram of exemplary token information in the embodiment.

FIG. 15 is a sequence diagram of an exemplary procedure for obtaining an OCR dictionary for a trial in the embodiment.

FIG. 16 is a sequence diagram of an exemplary procedure for performing translation processing regarding a translation trial in the embodiment.

DESCRIPTION OF EMBODIMENTS

An embodiment of an information processing system, an information processing apparatus, and an information processing method according to the present invention will be described in detail below with reference to the drawings. In the following description, a multifunction peripheral (MFP) will be described as an example of the information processing apparatus according to the present invention. However, the information processing apparatus is not limited to this and may be a projector and the like. The multifunction peripheral is an apparatus having a plurality of different functions such as a copy function, a scanner function, a print function, and a FAX function.

FIG. 1 is a diagram of an exemplary outline structure of an information processing system 1 according to the present embodiment. As illustrated in FIG. 1, the information processing system 1 includes an MFP 100, a translation server 200, and a module management server 300 which are connected to each other via a network 400.

Although a specific content will be described below, the MFP 100 includes a body 10 and an operation unit 20 which receives an operation by a user. The body 10 can realize various functions such as a copy function, a scanner function, a FAX function, and a printer function. In this example, a browser application (application to provide a function of a Web browser) to be installed to the operation unit 20 downloads and displays a translation application from the translation server 200.

The translation application is an application to provide a translation service for translating text data obtained by OCR processing to recognize letters included in image data read from a document and informing the user of the translation result. In the present embodiment, a function of the translation application in a case where a service to allow the user to use the translation service for free for a certain period (may be referred to as "translation trial" below) is provided will be mainly described.

The translation application according to the present embodiment is a software (that is, Web application) which can use an application arranged in the translation server 200 by using the browser application to be installed to the operation unit 20. However, the translation application is not limited to this and may be a normal application in which the translation application is installed to the operation unit 20. However, as the present embodiment, according to a form in which the translation application is the Web application, there is an advantage that it is not necessary to install the translation application to the operation unit 20.

In this example, when the user inputs an URL of a Web page (may be referred to as "trial home page" below) of the translation trial managed by the translation server 200 relative to the operation unit 20, the browser application requests (http request) data of the trial home page relative to the translation server 200. The translation server 200 which has received this request responses (http response) the requested data to the browser application. The browser application analyzes the data received from the translation server 200 and displays the trial home page as illustrated in FIG. 2 on the operation unit 20.

In the trial home page illustrated in FIG. 2, a button to apply to the translation trial (button such as "trial version application" in the example in FIG. 2) is displayed. When the user presses this button, a screen displayed on the operation unit 20 is switched to an account creation screen as illustrated in FIG. 3. When the user inputs a mail address relative to the account creation screen and presses a button (button such as "apply" in the example in FIG. 3) to instruct to apply to the translation trial, the translation server 200 transmits a notification mail to the input mail address as an address. In the notification mail, an URL (application URL) of the Web page (application page) to apply is written as a link destination. The user accesses the application URL written in the received notification mail and inputs a user name and a login password to the application page. Then, the user makes an application after agreeing on terms and the like. The translation server 200 registers second user information (to be described) to identify the user for each user who has made an application. A detail of the function of the translation application in a case where the translation trial is provided will be described below.

The description returns to FIG. 1 and will be continued. The module management server 300 holds an OCR dictionary to perform OCR processing and has a function to issue token information to be described. A more specific content will be described below.

Next, a hardware configuration of the MFP 100 will be described with reference to FIG. 4. As illustrated in FIG. 4, the MFP 100 includes the body 10 and the operation unit 20 which receives the operation by the user. The body 10 can realize various functions such as the copy function, the scanner function, the FAX function, and the printer function. The reception of the operation by the user is a concept including the reception of information input according to the operation by the user (including a signal and the like indicating a coordinate value of the screen). The body 10 and the operation unit 20 are connected to each other via an exclusive communication path 30 so as to communicate with each other. For example, the communication path 30 of a universal serial bus (USB) standard can be used. However, the communication path 30 may be a communication path of any standards regardless wired or wireless.

The body 10 can perform behavior according to the operation received by the operation unit 20. Also, the body 10 can communicate with an external device such as a client PC (personal computer) and can behave according to an instruction received from the external device.

First, a hardware configuration of the body 10 will be described. As illustrated in FIG. 4, the body 10 includes a CPU 11, a ROM 12, a RAM 13, a hard disk drive (HDD) 14, a communication interface (I/F) 15, a connection I/F 16, and an engine 17. These are connected to each other via a system bus 18.

The CPU 11 totally controls the behavior of the body 10. The CPU 11 controls the behavior of the whole body 10 by executing a program stored in the ROM 12, the HDD 14, or the like while having the RAM 13 as a work area (work region). Then, the CPU 11 realizes various functions such as the copy function, the scanner function, the FAX function, and the printer function described above.

The communication I/F 15 is an interface to connect to the network 400. The connection I/F 16 is an interface to communicate with the operation unit 20 via the communication path 30.

The engine 17 is a hardware which performs processing other than general information processing and communication to realize the copy function, the scanner function, the FAX function, and the printer function. For example, the engine 17 includes a scanner (image reader) for reading an image of the document by scanning it, a plotter (image forming unit) for printing the image on a sheet material such as paper, and a facsimile for performing fax communication. In addition, the engine 17 can include a specific option such as a finisher for sorting the printed sheet materials and an automatic document feeding device (ADF) for automatically feeding the document.

Next, a hardware configuration of the operation unit 20 will be described. As illustrated in FIG. 4, the operation unit 20 includes a CPU 21, a ROM 22, a RAM 23, a flash memory 24, a communication I/F 25, a connection I/F 26, and an operation panel 27. These are connected to each other via a system bus 28.

The CPU 21 totally controls the behavior of the operation unit 20. The CPU 21 controls the behavior of the whole operation unit 20 by executing a program stored in the ROM 22, the flash memory 24, or the like while having the RAM 23 as a work area (work region). Then, the CPU 21 realizes various functions to be described below such as a display of information (image) according to the input received from the user.

The communication I/F 25 is an interface to connect to the network 400. The connection I/F 26 is an interface to communicate to the body 10 via the communication path 30.

The operation panel 27 receives various inputs according to the operation by the user and displays various information (for example, information according to the received operation, information indicating behavior condition of the MFP 100, and information indicating a setting state). In this example, the operation panel 27 is configured of a liquid crystal display device (LCD) having a touch panel function mounted therein. However, the operation panel 27 is not limited to this. For example, the operation panel 27 may be configured of an organic EL display device having the touch panel function mounted therein. In addition to this or instead of this, an operation unit such as a hardware key and a display unit such as a lamp can be provided.

Next, a software configuration of the MFP 100 will be described. FIG. 5 is a schematic diagram of an exemplary software configuration of the MFP 100. As illustrated in FIG. 5, the body 10 includes an application layer 101, a service layer 102, and an OS layer 103. Entities of the application layer 101, the service layer 102, and the OS layer 103 are various software stored in the ROM 12, the HDD 14, and the like. The CPU 11 executes these software so as to provide various functions.

The software of the application layer 101 is an application software (may be simply referred to as "application" below) to operate hardware resources and provide a predetermined function. For example, as the application, a copy application to provide the copy function, a scanner application to provide the scanner function, a FAX application to provide the FAX function, and a printer application to provide the printer function are exemplified.

The software of the service layer 102 is provided between the application layer 101 and the OS layer 103 and provides an interface to use the hardware resources included in the body 10 relative to the application. More specifically, the software of the service layer 102 is a software to provide a function to receive a behavior request to the hardware resources and arbitrate the behavior request. A request to read by the scanner and print by the plotter can be considered as the behavior request received by the service layer 102.

The function of the interface by the service layer 102 is provided not only to the application layer 101 of the body 10 but also an application layer 201 of the operation unit 20. That is, also, the application layer 201 (application) of the operation unit 20 can realize the function by using the hardware resources of the body 10 (for example, engine 17) via the interface function of the service layer 102.

The software of the OS layer 103 is a basic software (operating system) to provide a basic function for controlling the hardware included in the body 10. The software of the service layer 102 converts a request to use the hardware resources from various applications into a command, which can be interpreted by the OS layer 103, and transmits it to the OS layer 103. The software of the OS layer 103 executes the command so that the hardware resources perform the behavior according to the request from the application.

Similarly, the operation unit 20 includes the application layer 201, the service layer 202, and the OS layer 203. The application layer 201, the service layer 202, and the OS layer 203 included in the operation unit 20 have a layered structure similar to that of the body 10. However, a function provided by the application of the application layer 201 and a kind of the behavior request which can be received by the service layer 202 are different from those of the body 10. The application of the application layer 201 may be a software to operate the hardware resources included in the operation unit 20 and provide a predetermined function. However, the application of the application layer 201 is a software which mainly provides a function of a user interface (UI) to perform operation and display regarding the function (copy function, scanner function, FAX function, and printer function) included in the body 10.

In the present embodiment, in order to maintain independence of the function, the software of the OS layer 103 of the body 10 is different from that of the OS layer 203 of the operation unit 20. That is, the body 10 and the operation unit 20 independently behave by using different operating systems. For example, it is possible to use the Linux (registered trademark) as the software of the OS layer 103 of the body 10 and use the Android (registered trademark) as the software of the OS layer 203 of the operation unit 20.

As described above, in the MFP 100 according to the present embodiment, the body 10 and the operation unit 20 behave by using different operating systems. Therefore, communication between the body 10 and the operation unit 20 is performed not as inter-process communication in a common device but as communication between different devices. This includes a behavior to transmit the information received by the operation unit 20 (instruction content from user) to the body 10 (command communication), a behavior to inform the operation unit 20 of an event by the body 10, and the like. Here, the operation unit 20 performs the command communication with the body 10, and accordingly, the function of the body 10 can be used. Also, as the event informed from the body 10 to the operation unit 20, an execution state of the behavior of the body 10, a content set to the body 10, and the like can be exemplified.

Also, in the present embodiment, since the power is supplied from the body 10 to the operation unit 20 via the communication path 30, power supply control of the operation unit 20 can be separately (independently) performed from that of the body 10.

Next, a function configuration of the MFP 100 will be described. FIG. 6 is a block diagram of an exemplary function configuration of the MFP 100. As illustrated in FIG. 6, the MFP 100 includes a login screen display unit 111, an authentication control unit 112, a first obtaining unit 113, a translation request screen display unit 104, a second obtaining unit 105, an addition unit 106, a function calling unit 107, a second processing unit 108, and a translation request unit 109. For convenience of description, the function provided by the translation application is mainly illustrated in FIG. 6. However, the function included in the MFP 100 is not limited to this.

The login screen display unit 111 displays a login screen on the operation panel 27 and receives the input of the first user information. The login screen prompts the input of the first user information which is used for authentication processing for determining whether the user has the authority to receive the provision of the translation trial. FIG. 7 is a diagram of an exemplary login screen according to the present embodiment. In this example, the first user information includes a combination of a mail address and a password. However, the first user information is not limited to this.

In the present embodiment, first, the user who tries to use the translation trial inputs the URL of the trial home page relative to the operation unit 20. According to this, the trial home page illustrated in FIG. 2 is displayed on the operation panel 27. In the trial home page illustrated in FIG. 2, a button ("to login screen" button in the example in FIG. 2) to request a display of the login screen is displayed. When the user presses this button, the translation application (login screen display unit 111) displays the login screen illustrated in FIG.

7 on the operation panel 27 and receives the input of the first user information (combination of mail address and password in this example).

The form of the trial home page is not limited to this and may be as follows. For example, when the user presses the button to request the display of the login screen on the trial home page, as illustrated in FIG. 8, the translation application (login screen display unit 111) displays a screen to prompt to select a user name of a user (user to be authenticated) who logs in from among a plurality of user names. When receiving an input to select a specific user, the translation application displays a screen to prompt the input of the password as illustrated in FIG. 9 and receives the input of the password.

The description returns to FIG. 6 and is continued. When the login screen display unit 111 has received the input of the first user information, the authentication control unit 112 requests the translation server 200 to perform the authentication processing by using the received first user information.

Here, a function configuration of the translation server 200 will be described with reference to FIG. 10. As illustrated in FIG. 10, the translation server 200 includes a storage unit 211, an authentication processing unit 212, and a first processing unit 213. For convenience of description, the functions according to the present invention are mainly illustrated in FIG. 10. However, the functions included in the translation server 200 are not limited to these.

The storage unit 211 stores the second user information to identify the user for each user who has made an application of the translation trial. In this example, the second user information includes the combination of the mail address and the password. However, the second user information is not limited to this. Here, it can be considered that the second user information is information to identify the user who has been previously registered as a person having the authority to receive the provision of the translation trial. From a different point of view, it can be also considered that the second user information is information to identify the user who has the authority to request to perform translation processing for translating the text data obtained by the OCR processing in which the letters included in the image data read from the document are recognized (in this example, translation processing which can be performed in a certain period, that is, translation processing regarding translation trial).

When receiving the first user information used for the authentication processing for determining whether the user has the authority to request to perform the first processing, the authentication processing unit 212 performs the authentication processing by comparing the first user information and the second user information. In this example, it can be considered that the first processing is processing for translating the text data obtained by the OCR processing in which the letters included in the image data read from the document are recognized and is processing which can be performed for free (without charging to user) for a certain period (translation processing regarding translation trial).

Also, in the authentication processing, when the first user information coincides with the second user information, it is determined that the user who has input the first user information has the authority to request to perform the first processing. When the first user information does not coincide with the second user information, it is determined that the user who has input the first user information does not have the authority to request to perform the first processing. In this example, in the authentication processing, when the first user information coincides with the second user information, it is determined that the user who has input the first user information has the authority to request to perform the translation processing regarding the translation trial (has the authority to receive the provision of the translation trial). When the first user information does not coincide with the second user information, it is determined that the user who has input the first user information does not have the authority to request to perform the translation processing regarding the translation trial.

In the present embodiment, when receiving the request, from the authentication control unit 112 of the MFP 100, to perform the authentication processing by using the first user information input by the user, the authentication processing unit 212 performs the authentication processing by comparing the received first user information with the second user information which has been previously stored in the storage unit 211. The authentication processing unit 212 informs the authentication control unit 112 of the result of the authentication processing.

The first processing unit 213 performs the first processing by using the result of second processing. As described above, in this example, the first processing is the translation processing regarding the translation trial. Also, in this example, the second processing is the OCR processing. A specific content of the first processing unit 213 and a specific example of the behavior of the translation server 200 will be described below.

The translation server 200 according to the present embodiment has a hardware configuration of a normal computer which includes a CPU, a ROM, a RAM, and the like. The above-mentioned storage unit 211 is realized by the ROM, the RAM, and the like. The respective functions of the authentication processing unit 212 and the first processing unit 213 are realized by executing the program stored in the ROM and the like by the CPU. However, the above functions are not limited to this. For example, at least a part of the respective functions of the authentication processing unit 212 and the first processing unit 213 may be realized by an exclusive hardware circuit (for example, semiconductor integrated circuit).

The description returns to FIG. 6 and is continued. When the authentication processing unit 212 has informed the authentication control unit 112 that the user who has input the first user information has been authenticated, the authentication control unit 112 informs the first obtaining unit 113 and the translation request screen display unit 104 of that effect.

When the MFP 100 (in this example, corresponding to "information processing apparatus" in CLAIMS) does not previously have first information to perform the second processing necessary for the first processing, the first obtaining unit 113 obtains second information indicating the first information held by the module management server 300 (in this example, corresponding to "server" in CLAIMS). More specifically, the first obtaining unit 113 determines whether the MFP 100 has the first information by referring to function detailed information which indicates a detailed content of the functions included in the MFP 100.

In this example, when receiving the notification that the user has been authenticated from the authentication control unit 112, the first obtaining unit 113 requests scanner capability information (example of function detailed information) which indicates detailed specs (performance) of the scanner function relative to the function calling unit 107 to be described and receives the scanner capability information from the function calling unit 107. The first obtaining unit 113 determines whether the MFP 100 previously has dictionary information to perform the OCR processing (may be referred to as "OCR dictionary" below) by referring to the received scanner capability information. The OCR dictionary is dictionary information indicating correspondence relation between a characteristic pattern and a letter, and various known configurations can be employed.

In this example, the OCR dictionary corresponds to "first information" in CLAIMS. However, the OCR dictionary is not limited to this. For example, the OCR dictionary may have a form having a module for providing a specific function to perform the OCR processing as the first information. In a word, it is preferable that the first information be information (may be data and module) to perform the second processing (in this example, OCR processing) necessary for the first processing (in this example, translation processing regarding translation trial). Also, for example, the first information may include a plurality of pieces of information (data or module), and the first obtaining unit 113 may concurrently obtain the plurality of pieces of information included in the first information.

FIG. 11 is a diagram of exemplary scanner capability information according to the present embodiment. In the example in FIG. 11, the scanner capability information is written in a JSON format. However, the scanner capability information is not limited to this. In the example in FIG. 11, the first obtaining unit 113 can determine whether the MFP 100 has the OCR dictionary by determining whether there are settings regarding the OCR processing written in the scanner capability information (in example in FIG. 11, "ocrList", "ocrLanguageList", and "omitBlankPageList").

When the first obtaining unit 113 has determined that the MFP 100 does not have the OCR dictionary, the first obtaining unit 113 requests the OCR dictionary (may be referred to as "OCR dictionary for trial" in the following description) held by the module management server 300 relative to the module management server 300. In this example, it can be considered that the OCR dictionary (OCR dictionary for trial) held by the module management server 300 corresponds to "second information" in CLAIMS. In the present embodiment, the first obtaining unit 113 includes data in which the device information for uniquely identifying the MFP 100 (for example, machine number) is encrypted with an encryption key which has been previously prepared (may be referred to as "encrypted device information" below) and transmits an OCR dictionary request signal for requesting the OCR dictionary to the module management server 300. The first obtaining unit 113 receives the OCR dictionary for the trial from the module management server 300 as a response to the OCR dictionary request signal. In this example, the first obtaining unit 113 performs the control to preserve the obtained OCR dictionary for the trial to the HDD 14 of the body 10. A more specific content will be described below.

Here, a function configuration of the module management server 300 will be described with reference to FIG. 12. As illustrated in FIG. 12, the module management server 300 includes a storage unit 301, an OCR dictionary for the trial transmitting unit 302, and a token information issuance unit 303. For convenience of description, the functions according to the present invention are mainly illustrated in FIG. 12. However, the functions included in the module management server 300 are not limited to this.

The storage unit 301 stores the OCR dictionary for the trial. The OCR dictionary for the trial is an OCR dictionary held by the module management server 300 and an OCR dictionary to be installed to the MFP 100 and used when the MFP 100 does not have the OCR dictionary.

The OCR dictionary for the trial transmitting unit 302 transmits the OCR dictionary for the trial stored in the storage unit 301 to the MFP 100. In this example, when receiving the OCR dictionary request signal from the MFP 100, the OCR dictionary for the trial transmitting unit 302 decrypts encrypted device information included in the OCR dictionary request signal with a decryption key (decryption key corresponding to encryption key used by MFP 100) which has been previously prepared. Then, the OCR dictionary for the trial transmitting unit 302 identifies the MFP 100 which has requested the OCR dictionary from the device information obtained by the decryption. The OCR dictionary for the trial transmitting unit 302 transmits the OCR dictionary for the trial stored in the storage unit 301 to the MFP 100 which is a request source.

The token information issuance unit 303 issues token information to be described. A specific content of the token information and a specific example of the behavior of the module management server 300 will be described below.

The module management server 300 according to the present embodiment has a hardware configuration of a normal computer which includes a CPU, a ROM, a RAM, and the like. The above-mentioned storage unit 301 is realized by the ROM, the RAM, and the like. The respective functions of the OCR dictionary for the trial transmitting unit 302 and the token information issuance unit 303 are realized by executing the program stored in the ROM and the like by the CPU. However, the above functions are not limited to this. For example, at least a part of the respective functions of the OCR dictionary for the trial transmitting unit 302 and the token information issuance unit 303 may be realized by an exclusive hardware circuit (for example, semiconductor integrated circuit).

In the present embodiment, the above-mentioned translation server 200 is separately provided from the above-mentioned module management server 300. However, the arrangement is not limited to this. For example, the above-mentioned translation server 200 and the above-mentioned module management server 300 may be configured of a single server.

The description returns to FIG. 6 and is continued. The translation request screen display unit 104 displays a translation request screen to request to perform the translation processing regarding the translation trial on the operation panel 27. More specifically, when receiving the notification indicating that the authentication control unit 112 has authenticated the user, the translation request screen display unit 104 displays the translation request screen as illustrated in FIG. 13 on the operation panel 27. In the example in FIG. 13, the authenticated user sets the document (document in which text (original text) to be translated has been written) to the scanner and makes inputs to designate a source language (language used to write original text) and a target language (language used to write translation result) from the translation request screen. After that, the user presses "translation start" button illustrated in FIG. 13. Accordingly, a translation request can be input which is to request to perform the translation processing (in this example, translation processing regarding translation trial) in which the text written in the document is translated from the designated source language to the target language.

When receiving a first request to request to perform the first processing, the second obtaining unit 105 obtains the token information indicating the presence of the authority to use the second information. In the present embodiment, when receiving the above-mentioned translation request (corresponding to first request), the second obtaining unit 105 transmits a token request signal to request to obtain the token information indicating that the user has the authority to use the OCR dictionary for the trial to the module management server 300. As a response to the signal, the second obtaining unit 105 receives the token information from the module management server 300. In this example, the token request signal includes date information indicating a current date and time (corresponding to date and time when MFP 100 has requested to obtain token information).

When receiving the token request signal from the MFP 100, the token information issuance unit 303 of the module management server 300 illustrated in FIG. 12 generates the token information by using the date information included in the received token request signal. In this example, the token information issuance unit 303 encrypts the token information with the previously prepared encryption key and transmits the encrypted token information (may be referred to as "encrypted token information" in the following description) to the MFP 100. In this example, the token information includes at least valid period information indicating a period in which the token information is valid. The valid period information indicates a period from a starting point that is a date and time when the MFP 100 (second obtaining unit 105) has requested to obtain the token information to an ending point when a certain period has elapsed from the starting point.

FIG. 14 is a diagram of exemplary token information. In the example in FIG. 14, the token information includes a pair of a key indicating "ID" and a value corresponding to it, a pair of a key indicating "Requested Time" and a value corresponding to it, a pair of a key indicating "Expiry Time" and a value corresponding to it, a pair of a key indicating "Service Class" and a value corresponding to it, and a pair of a key indicating "Charge Kind" and a value corresponding to it. The "ID" is an item which expresses an identifier allocated for each token information, and the corresponding value can be expressed, for example, in a uuid format. The "Requested Time" is an item which expresses the date and time (corresponding to date and time indicated by date information included in token request signal) when the MFP 100 (second obtaining unit 105) has requested to obtain the token information, and the corresponding value can be expressed, for example, in a RFC3339 format. The "Expiry Time" is an item which expresses the period from the starting point that is the date and time when the MFP 100 has requested to obtain the token information (date and time indicated by the value corresponding to "Requested Time" in this example) to the ending point when a certain period has elapsed from the starting point. The corresponding value can be expressed, for example, in the RFC3339 format. The "Service Class" is an item which expresses a service name. In this example, the corresponding value can be expressed by a fixed character string such as "translate" which means the translation service. The "Charge Kind" is an item which expresses a license (use authority) for the OCR dictionary for the trial. In this example, the corresponding value can be expressed by a fixed character string such as "trial" which means the license for the translation trial.

The description returns to FIG. 6 and is continued. When the second obtaining unit 105 has obtained the token information, the addition unit 106 adds the token information to a second request for requesting to perform the second processing. As described above, the second processing is the OCR processing in this example. When the second obtaining unit 105 has obtained the encrypted token information, the addition unit 106 adds (sets) the obtained encrypted token information to an OCR request for requesting to perform the OCR processing. The addition unit 106 transmits the OCR request to which the encrypted token information has been added to the function calling unit 107 to be described.

Regarding the function calling unit 107, the application on the side of the operation unit 20 is an interface for calling the function of the body 10, for example, a Web application programming interface (API). In the present embodiment, when receiving the scanner capability information request from the first obtaining unit 113, the function calling unit 107 requests the scanner capability information relative to the scanner application (in this example, second processing unit 108 to be described) and obtains the scanner capability information from the scanner application. The function calling unit 107 transmits the obtained scanner capability information to the second obtaining unit 105.

Also, when receiving the OCR request to which the encrypted token information has been added, the function calling unit 107 confirms validity of the token information. More specifically, the function calling unit 107 tries to decrypt the encrypted token information by using the decryption key (decryption key corresponding to encryption key used by module management server 300) which has been previously prepared. When the encrypted token information can be decrypted by the decryption key which has been previously prepared, the function calling unit 107 determines that the token information is valid (token information has been issued by module management server 300) and transmits the OCR request to which the decrypted token information has been added to the second processing unit 108 to be described. In the present embodiment, the function calling unit 107 confirms the validity of the token information. However, the configuration is not limited to this, and for example, the second processing unit 108 to be described may confirm the validity of the token information.

Only when the token information has been added to the second request, the second processing unit 108 performs the second processing by using the second information. More specifically, only when the time when the second request to which the token information has been added has been received is within a period indicated by the valid period information included in the token information, the second processing unit 108 performs the second processing by using the second information.

In the present embodiment, only when the token information has been added to the OCR request received from the function calling unit 107, the second processing unit 108 performs processing according to the OCR request by using the OCR dictionary for the trial. More specifically, the second processing unit 108 performs scan processing for reading image data from the document and performs the OCR processing to the image data read from the document by using the OCR dictionary for the trial. According to this, a PDF with a transparent text is generated. The PDF with the transparent text generated by the second processing unit 108 is transmitted to the translation request unit 109 to be described via the function calling unit 107.

In this example, when the token information has not been added to the OCR request received from the function calling unit 107 and the OCR dictionary preserved in the body 10 is the OCR dictionary for the trial, the second processing unit 108 abandons the OCR request. Also, in this example, the second processing unit 108 is a function provided by the scanner application. However, the second processing unit 108 is not limited to this.

The translation request unit 109 requests the translation server 200 to translate the text data of the PDF with the transparent text generated by the second processing unit 108 from the source language designated by the translation request to the target language.

The translation server 200 (first processing unit 213), which has received the request from the translation request unit 109, performs the translation processing for translating the text data of the PDF with the transparent text generated by the second processing unit 108 from the source language designated by the translation request to the target language. In this example, the first processing unit 213 performs the control to transmit a mail in which a link destination of a file of the result of the translation processing (may be referred to as "translation result file" below) has been written (may be referred to as "result notification mail" below) to a mail address included in the second user information to identify the user (authenticated user) who has input the translation request as an address. The user who has input the translation request accesses the link destination written in the result notification mail and downloads and obtains the translation result file. The procedure is not limited to this, and, for example, may be a form for displaying the result of the translation processing on the operation panel 27 of the operation unit 20.

In the present embodiment, the respective functions of the login screen display unit 111, the authentication control unit 112, the translation request screen display unit 104, the first obtaining unit 113, the second obtaining unit 105, the addition unit 106, and the translation request unit 109 described above are provided by the translation application, and the respective functions of the function calling unit 107 and the second processing unit 108 described above are provided by the software mounted in the body 10. However, these are not limited to this.

Next, an exemplary procedure for obtaining the OCR dictionary for the trial by the MFP 100 will be described with reference to FIG. 15. The description will be made on the assumption that a program written in JavaScript (registered trademark) (may be referred to as "JavaScript (registered trademark)" below) is installed to the operation unit 20 and the body 10 includes a SCS 110 for managing (hold) encrypted device information described above in the example in FIG. 15.

In the example in FIG. 15, it is assumed that the user be authenticated and the translation application be started in steps S1 and S2. The translation application (first obtaining unit 113) requests the scanner capability information relative to the function calling unit 107 on the side of the body 10 by using the JavaScript (registered trademark) (step S3). The function calling unit 107, which has received this request, requests the scanner capability information relative to the second processing unit 108 (step S4) and obtains the scanner capability information as a response to it (step S5). Next, the function calling unit 107 transmits the scanner capability information obtained in step S5 to the translation application by using the JavaScript (registered trademark) (step S6). According to this, the translation application can obtain the scanner capability information. In the following description, it is assumed that the transmission/reception of information between the translation application and the body 10 and that between the translation application and the module management server 300 be performed by using the JavaScript (registered trademark).

Next, the translation application (first obtaining unit 113) determines whether the MFP 100 previously includes the OCR dictionary by referring to the scanner capability information (step S7). In the following description, a case will be described where it has been determined that the MFP 100 has not previously included the OCR dictionary. The first obtaining unit 113 requests the encrypted device information relative to the SCS 110 (step S8) and obtains the encrypted device information as a response to it (step S9).

Next, the translation application (first obtaining unit 113) transmits the above-mentioned OCR dictionary request signal, which includes the encrypted device information and requests the OCR dictionary, to the module management server 300 (step S10). The module management server 300 (OCR dictionary for the trial transmitting unit 302) which has received the OCR dictionary request signal decrypts the encrypted device information included in the received OCR dictionary request signal with the decryption key which has been previously prepared (step S11). Then, the module management server 300 identifies the MFP 100 which has requested the OCR dictionary according to the device information obtained by the decryption. The module management server 300 (OCR dictionary for the trial transmitting unit 302) transmits the OCR dictionary for the trial stored in the storage unit 301 to the MFP 100 of the request source (step S12). According to this, the translation application (first obtaining unit 113) can obtain the OCR dictionary for the trial from the module management server 300.

When the acquisition of the OCR dictionary for the trial is completed, the translation application (first obtaining unit 113) requests the function calling unit 107 on the side of the body 10 to preserve the OCR dictionary for the trial (step S13). The function calling unit 107 which has received the request from the translation application requests the second processing unit 108 to preserve the OCR dictionary for the trial (step S14). The second processing unit 108 which has received the request from the function calling unit 107 prepares a region to preserve the OCR dictionary for the trial, for example, in the HDD 14 of the body 10 and preserves the OCR dictionary for the trial in the prepared region (step S15). For example, a form may be used in which information indicating a kind of the OCR dictionary (information to identify whether the OCR dictionary is the one which has been previously included in the MFP 100 or the OCR dictionary for the trial) is preserved in association with the OCR dictionary for the trial. When the preservation of the OCR dictionary for the trial has been completed, the second processing unit 108 informs the function calling unit 107 that the preservation of the OCR dictionary for the trial has been completed (step S16). Then, the function calling unit 107 informs the translation application of that effect (step S17).

Next, an exemplary procedure to perform the translation processing regarding the translation trial will be described with reference to FIG. 16. The description will be made below on the assumption that the MFP 100 has obtained the OCR dictionary for the trial in accordance with the procedure illustrated in FIG. 15.

First, when receiving the above-mentioned translation request via the above-mentioned translation request screen (steps S20 and S21), the translation application (second obtaining unit 105) transmits the above-mentioned token request signal for requesting to issue the token information to the module management server 300 by using the JavaScript (registered trademark) (step S22). The module management server 300 (token information issuance unit 303) which has received the token request signal generates the token information by using the date information included in the received token request signal (step S23). The specific content is as described above. In this example, as described above, the module management server 300 (token information issuance unit 303) generates the encrypted token information by encrypting the token information with the encryption key which has been previously prepared. After that, the module management server 300 transmits the generated encrypted token information to the translation application by using the JavaScript (registered trademark) (step S24).

Next, the translation application (addition unit 106) adds the encrypted token information received from the module management server 300 to the OCR request for requesting to perform the OCR processing. The translation application transmits the OCR request to which the encrypted token information has been added to the function calling unit 107 on the side of the body 10 by using the JavaScript (registered trademark) (step S25). When receiving the OCR request to which the encrypted token information has been added, the function calling unit 107 confirms the validity of the token information (step S26). The specific content is as described above. A case will be described below where it has been determined that the token information is valid.

After step S26, the function calling unit 107 transmits the OCR request to which the decrypted token information has been added to the second processing unit 108 (step S27). The second processing unit 108 confirms that the token information has been added to the OCR request received from the function calling unit 107 (step S28) and performs the processing according to the OCR request. More specifically, first, the second processing unit 108 performs the scan processing for reading the image data from the document. The second processing unit 108 performs the OCR processing relative to the image data read from the document by using the OCR dictionary for the trial (steps S29 and S30). Accordingly, the PDF with the transparent text is generated. The second processing unit 108 transmits the generated PDF with the transparent text to the function calling unit 107 (step S31). The function calling unit 107 transmits the PDF with the transparent text received from the second processing unit 108 to the translation application by using the JavaScript (registered trademark) (step S32).

The translation application (translation request unit 109), which has received the PDF with the transparent text as a response to the OCR request, requests the translation server 200 to translate the text data of the PDF with the transparent text from the source language designated by the above-mentioned translation request to the target language (step S33). The translation server 200 (first processing unit 213) which has received this request performs the translation processing for translating the text data of the PDF with the transparent text from the source language designated by the translation request to the target language (step S34). When the translation processing has been completed, as described above, the translation server 200 (first processing unit 213) transmits the result notification mail in which the link destination of the translation result file has been written to the mail address, which is included in the second user information to identify the user who has input the translation request, as an address (step S35). The translation server 200 (first processing unit 213) can also inform the translation application that the translation processing has been completed.

As described above, in the present embodiment, only when the token information which indicates the presence of the authority to use the OCR dictionary for the trial is added to the OCR request for requesting to perform the OCR processing necessary for the translation processing regarding the translation trial, the OCR processing is performed by using the OCR dictionary for the trial. Since the token information is issued when the translation request for requesting to perform the translation processing regarding the translation trial is received, the OCR processing cannot be performed by using the OCR dictionary for the trial without inputting the translation request. That is, there is an advantageous effects to prevent the OCR dictionary for the trial from being used for a function other than the above-mentioned translation trial.

Although the embodiment according to the present invention has been described above, the present invention is not limited to the above-mentioned embodiment. In an implementing stage, the embodiment can be materialized by modifying the components without departing from the scope of the invention. Also, various inventions can be formed by an appropriate combination of a plurality of components disclosed in the above-mentioned embodiment. For example, some components may be deleted from all the components illustrated in the embodiment.

The respective functions of the MFP 100 described above (login screen display unit 111, authentication control unit 112, first obtaining unit 113, translation request screen display unit 104, second obtaining unit 105, addition unit 106, function calling unit 107, second processing unit 108, and translation request unit 109) can be realized by executing the program stored in the above-mentioned translation application (Web application in this example) and the storage device (for example, ROM 12, HDD 14, ROM 22, and flash memory 24) by the CPU (11 or 21). However, the structure is not limited to this. For example, at least a part of the respective functions of the MFP 100 may be realized by an exclusive hardware circuit (for example, semiconductor integrated circuit).

Also, in the above-mentioned embodiment, the body 10 and the operation unit 20 independently behave by using different operating systems. However, they are not limited to this, and for example, the body 10 and the operation unit 20 may behave by using the same operating system.

Also, the program performed by the MFP 100 in the embodiment described above may be provided by recording it to recording medium such as a CD-ROM, a flexible disk (FD), a CD-R, a digital versatile disk (DVD), and a universal serial bus (USB) which can be read by the computer by using a file in a format which can be installed or performed. Also, the program may be provided or distributed via a network such as the Internet. Also, various programs may be provided by being previously integrated into the ROM and the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST 1 information processing system
10 body
20 operation unit
100 MFP
104 translation request screen display unit
105 second obtaining unit
106 addition unit
107 function calling unit
108 second processing unit
109 translation request unit
111 login screen display unit 112 authentication control unit
113 first obtaining unit
200 translation server
211 storage unit
212 authentication processing unit
213 first processing unit
300 module management server
301 storage unit
302 OCR dictionary for the trial transmitting unit
303 token information issuance unit
400 network

CITATION LIST

Patent Literature

PTL 1: Japanese Patent No. 4474440

The invention claimed is:

1. An information processing system, comprising:
an information processing apparatus; and
a server, wherein
the information processing apparatus includes processing circuitry configured to
obtain second information that is held by the server and is used to perform second processing necessary for first processing, when the information processing apparatus does not have first information that is used to perform the second processing,
obtain token information indicating presence of authority to use the second information when receiving a first request requesting to perform the first processing,
add the token information to a second request requesting to perform the second processing when the processing circuitry has obtained the token information, and
perform the second processing by using the second information only when the token information has been added to the second request.

2. The information processing system according to claim 1, wherein the processing circuitry is further configured to determine whether the information processing apparatus has the first information by referring to function detailed information indicating a detailed content of a function of the information processing apparatus.

3. The information processing system according to claim 1, wherein
the token information includes valid period information indicating a period in which the token information is valid, and
the processing circuitry is further configured to perform the second processing by using the second information only in a case where a time when the second request to which the token information has been added is received is within a period indicated by the valid period information included in the token information.

4. The information processing system according to claim 3, wherein the valid period information is information indicating a period from a starting point that is a date and time when the processing circuitry has requested to obtain the token information to an ending point when a certain period has elapsed.

5. The information processing system according to claim 1, wherein the processing circuitry is further configured to perform authentication processing by comparing first user information with second user information to identify a user who has an authority to request to perform the first processing, when receiving the first user information used for the authentication processing for determining whether the user has the authority to request to perform the first processing.

6. The information processing system according to claim 5, wherein
the authentication processing is processing in which it is determined that the user who has input the first user information has the authority to request to perform the first processing, when the first user information coincides with the second user information and it is determined that the user who has input the first user information does not have the authority to request to perform the first processing, when the first user information does not coincide with the second user information.

7. The information processing system according to claim 1, wherein the processing circuitry is further configured to perform the first processing by using a result of the second processing.

8. The information processing system according to claim 1, wherein
the first processing is processing for translating text data obtained by OCR processing that recognizes letters included in image data read from a document and is performed for free for a certain period,
the second processing is the OCR processing,
the first information is dictionary information indicating a correspondence relation between a characteristic pattern and letters, and
the second information is the dictionary information held by the server.

9. An information processing apparatus, comprising:
processing circuitry configured to
obtain second information that is held by a server and is used to perform second processing necessary for first processing, when first information, which is used to perform the second processing, has not been previously obtained;
obtain token information indicating presence of authority to use the second information when receiving a first request requesting to perform the first processing;
add token information to a second request requesting to perform the second processing when the processing circuitry has obtained the token information; and
perform the second processing by using the second information only when the token information has been added to the second request.

10. An information processing method, comprising:
obtaining second information that is held by a server and is used to perform second processing necessary for first processing, when first information, which is used to perform the second processing, has not been previously obtained;
obtaining token information indicating presence of authority to use the second information when a first request requesting to perform the first processing has been received;
adding token information to a second request requesting to perform the second processing when the token information has been obtained; and
performing the second processing by using the second information only when the token information has been added to the second request.

* * * * *